(12) United States Patent
Schneider

(10) Patent No.: US 12,099,227 B1
(45) Date of Patent: Sep. 24, 2024

(54) FIBER OPTIC TINSEL GARLAND

(71) Applicant: Michael Joseph Schneider, Cape Coral, FL (US)

(72) Inventor: Michael Joseph Schneider, Cape Coral, FL (US)

(*) Notice: Subject to any disclaimer, the term of this patent is extended or adjusted under 35 U.S.C. 154(b) by 0 days.

(21) Appl. No.: 18/315,749

(22) Filed: May 11, 2023

(51) Int. Cl.
*F21V 8/00* (2006.01)
*F21S 4/10* (2016.01)

(52) U.S. Cl.
CPC ............. *G02B 6/0008* (2013.01); *F21S 4/10* (2016.01); *G02B 6/0006* (2013.01)

(58) Field of Classification Search
CPC ......... A47G 2200/08; A47G 2033/0827; F21S 4/22; F21S 4/26; F21S 4/10; F21S 4/00; G02B 6/0006; G02B 6/0008; F21W 2121/00; F21W 2121/04; F21V 2200/10; F21V 2200/13
See application file for complete search history.

(56) References Cited

U.S. PATENT DOCUMENTS

| | | | | |
|---|---|---|---|---|
| 3,624,385 A * | 11/1971 | Wall | ..................... | G02B 6/4298 385/115 |
| 4,858,086 A * | 8/1989 | Pietrantonio | ........ | G02B 6/0005 428/10 |
| 5,057,981 A * | 10/1991 | Bowen | ...................... | F21S 4/20 362/808 |
| 5,558,422 A * | 9/1996 | Sanford | ............... | G02B 6/0005 362/171 |
| 6,299,339 B1 * | 10/2001 | Chu | ....................... | F21S 10/005 362/567 |
| 6,352,355 B1 * | 3/2002 | Law | ......................... | F21S 4/20 362/253 |
| 6,386,746 B1 * | 5/2002 | Kao | ...................... | G02B 6/0008 362/567 |
| 6,517,219 B1 * | 2/2003 | Chen | ........................ | F21S 4/22 362/349 |
| 6,565,251 B2 * | 5/2003 | Chen | ........................ | F21S 4/20 362/555 |
| 6,739,745 B1 * | 5/2004 | Valdes | .................. | G02B 6/0008 362/802 |
| 6,779,906 B1 * | 8/2004 | Delmar | ..................... | F21S 4/10 362/374 |
| 7,661,847 B2 * | 2/2010 | Wang | ...................... | D04H 11/00 362/124 |
| 11,604,309 B2 * | 3/2023 | Schneider | ................ | F21S 4/10 |
| 2002/0047516 A1 * | 4/2002 | Iwasa | ...................... | H01J 61/72 313/512 |
| 2004/0141319 A1 * | 7/2004 | Huang | ..................... | F21S 4/10 362/227 |

(Continued)

*Primary Examiner* — Bao Q Truong
(74) *Attorney, Agent, or Firm* — Kim IP Law Group LLC

(57) ABSTRACT

Illuminated tinsel garland comprising, according to a first exemplary embodiment, an elongated flexible transparent tube; a flexible electrically powered illumination string disposed in the tube; and a plurality of radially directed fiber optic filaments secured to an exterior of the tube. According to a second exemplary embodiment, the illuminated tinsel garland comprises a flexible electrically powered illumination string including a plurality of lamps spaced apart no more than about 3 cm along the string; and a bundle of fiber optic filaments in light-transmissive communication with each one of the plurality of lamps.

7 Claims, 4 Drawing Sheets

(56) References Cited

U.S. PATENT DOCUMENTS

2007/0025120 A1\* 2/2007 Lemay ................ F21S 10/005
362/555
2007/0159842 A1\* 7/2007 Cole ........................ F21S 4/10
362/555

\* cited by examiner

FIBER OPTIC TINSEL GARLAND

FIELD OF THE INVENTION

The exemplary embodiments of present disclosure relate generally to a illumination device and, more specifically, to a decorative illumination device in the form of illuminated fiber optic tinsel garland.

BACKGROUND OF THE DISCLOSURE

Tinsel garlands are generally used for decoration during the Holidays. The garlands have reflective surfaces that, in daylight, make the tinsel visually sparkling to a viewer, and adds to the festiveness of the decoration during the Holidays. Attempts have been made to illuminate the tinsel garlands. For example, a string of small incandescent light bulbs or light emitting diodes (LEDs) may be wound around the tinsel garland, so that light from the light bulbs may reflect off of the tinsel garland so that it can be seen at night. However, because of the substantial spacing between light bulbs and LEDs in conventional light strings, illumination of the tinsel garland is uneven and discontinuous.

An advantage exists, therefore, for a tinsel garland that radiates light substantially continuously throughout its length.

BRIEF SUMMARY OF THE DISCLOSURE

In accordance with an exemplary embodiment there is provided an illuminated tinsel garland comprising an elongated flexible transparent tube; a flexible electrically powered illumination string disposed in the tube; and a plurality of radially directed fiber optic filaments secured to an exterior of the tube.

According to an aspect, the tube is clear. According to another aspect, the tube is colorless. According to another aspect, the tube is from about 1 m to 10 m in length.

According to an aspect, the illumination string is selected from an incandescent lamp light string, an LED lamp light string and a neon lamp light string. According to another aspect, the illumination string is alternating current (AC) powered and includes a male electrical plug at a first end of the string and a female plug socket at a second end of the string opposite the first end. According to another aspect, the illumination string is direct current (DC) powered.

According to an aspect, the plurality of radially directed fiber optic filaments are secured to the exterior of the tube by adhesive bonding, solvent bonding or heat bonding. According to another aspect, the plurality of radially directed fiber optic filaments are spaced apart from about 3 mm to 5 mm about the exterior of the tube. According to another aspect, the plurality of radially directed fiber optic filaments are spaced apart less than about 3 mm about the exterior of the tube.

In accordance with another exemplary embodiment, there is provided an illuminated tinsel garland comprising a flexible electrically powered illumination string including a plurality of lamps spaced apart no more than about 3 cm along the string; and a bundle of fiber optic filaments in light-transmissive communication with each one of the plurality of lamps.

According to an aspect, proximal ends of the fiber optic filaments receive light emitted by the lamp, which light emanates from distal ends of the fiber optic filaments. According to another aspect, the illuminated tinsel garland further comprises a housing containing one of the plurality of lamps and proximal portions of the bundle of fiber optic filaments associated with the lamp. According to another aspect, the fiber optic filaments are flexible. According to another aspect, the fiber optic filaments bend and diverge at a point where they exit the housing, whereby the fiber optic filaments project light in a wider circumference than a circumference of the housing. According to another aspect, the plurality of lamps are incandescent or LED lamps. According to another aspect, the garland is between about 1 m to 10 m in length.

Other features and advantages of the subject disclosure will be apparent from the following more detailed description of the exemplary embodiments.

BRIEF DESCRIPTION OF THE SEVERAL VIEWS OF THE DRAWINGS

The foregoing summary, as well as the following detailed description of the exemplary embodiments of the subject disclosure, will be better understood when read in conjunction with the appended drawings. For the purpose of illustrating the present disclosure, there are shown in the drawings exemplary embodiments. It should be understood, however, that the subject application is not limited to the precise arrangements and instrumentalities shown.

DETAILED DESCRIPTION OF THE DISCLOSURE

Figure 1:
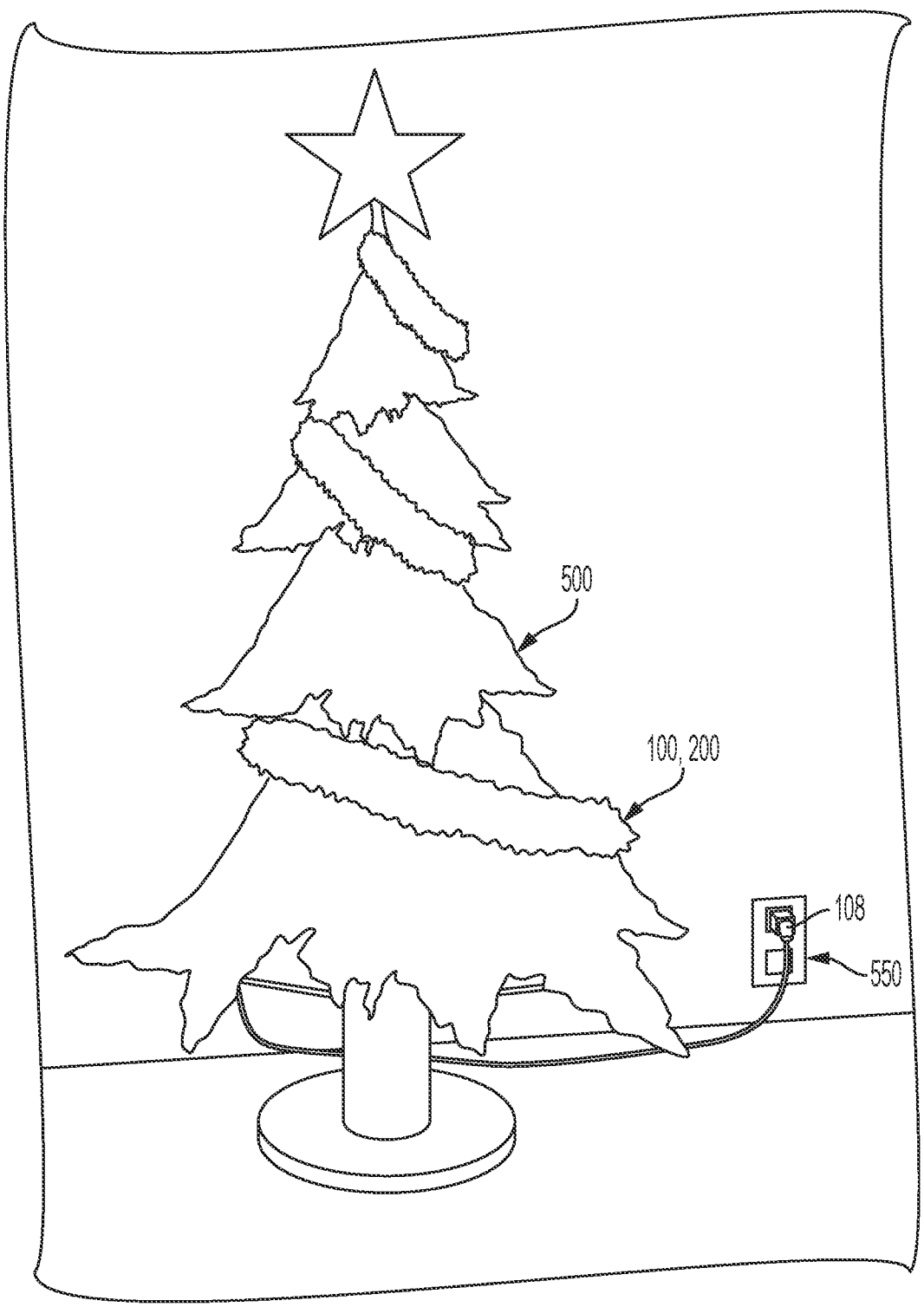
FIG. 1 is an elevational view of a Christmas tree adorned with illuminated tinsel garland constructed in accordance with the subject disclosure.

Reference will now be made in detail to the various exemplary embodiments of the subject disclosure illustrated in the accompanying drawings. Wherever possible, the same or like reference numbers will be used throughout the drawings to refer to the same or like features. It should be noted that the drawings are in simplified form and are not drawn to precise scale. Certain terminology is used in the following description for convenience only and is not limiting. Directional terms such as top, bottom, left, right, above, below and diagonal, are used with respect to the accompanying drawings. The term "distal" shall mean away from the center of a body. The term "proximal" shall mean closer towards the center of a body and/or away from the "distal" end. The words "inwardly" and "outwardly" refer to directions toward and away from, respectively, the geometric center of the identified element and designated parts thereof. Such directional terms used in conjunction with the following description of the drawings should not be construed to limit the scope of the subject application in any manner not explicitly set forth. Additionally, the term "a," as used in the specification, means "at least one." The terminology includes the words above specifically mentioned, derivatives thereof, and words of similar import.

"About" as used herein when referring to a measurable value such as an amount, a temporal duration, and the like, is meant to encompass variations of ±20%, ±10%, ±5%, ±1%, or ±0.1% from the specified value, as such variations are appropriate.

"Substantially" as used herein shall mean considerable in extent, largely but not wholly that which is specified, or an appropriate variation therefrom as is acceptable within the field of art. "Exemplary" as used herein shall mean serving as an example.

Throughout the subject application, various aspects thereof can be presented in a range format. It should be understood that the description in range format is merely for convenience and brevity and should not be construed as an inflexible limitation on the scope of the subject disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Furthermore, the described features, advantages and characteristics of the exemplary embodiments of the subject disclosure may be combined in any suitable manner in one or more embodiments. One skilled in the relevant art will recognize, in light of the description herein, that the subject disclosure can be practiced without one or more of the specific features or advantages of a particular exemplary embodiment. In other instances, additional features and advantages may be recognized in certain embodiments that may not be present in all exemplary embodiments of the present disclosure.

Figure 2:
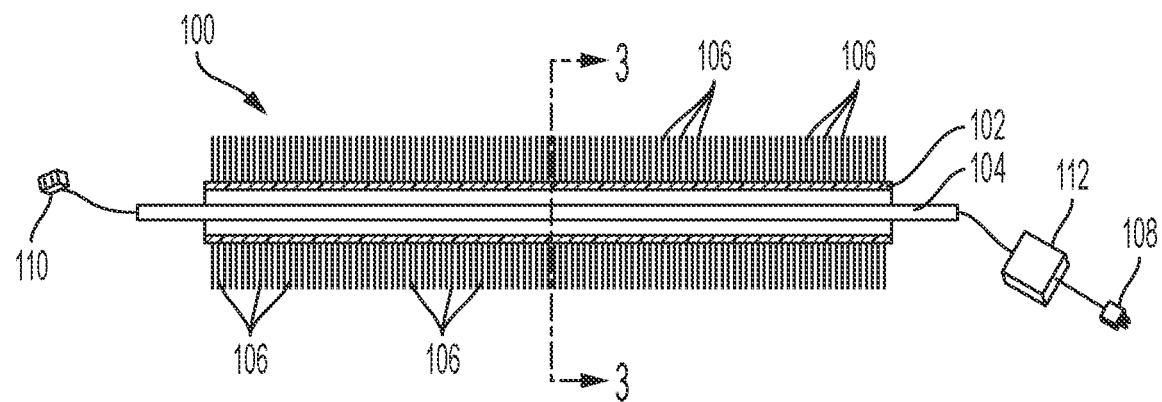
FIG. 2 is a longitudinal partial cross-sectional view of a first exemplary embodiment of the illuminated tinsel garland of FIG. 1.
Figure 3:
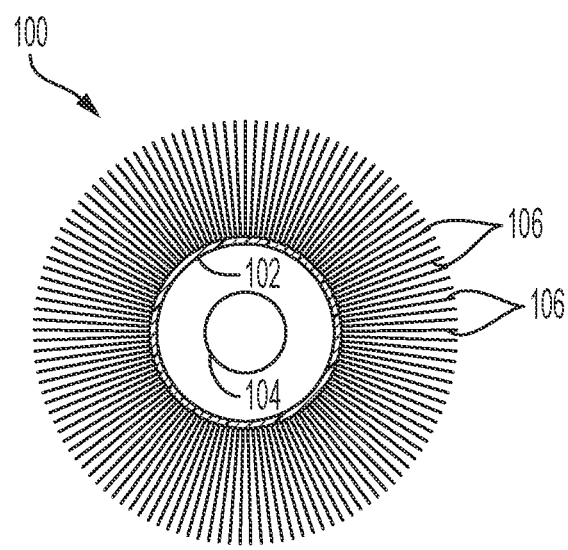
FIG. 3 is an enlarged transverse cross-sectional view of the illuminated tinsel garland taken along line III-III of FIG. 2.

Referring now to the drawings, FIG. 1 illustrates a Christmas tree 500 adorned with illuminated tinsel garland 100 (or 200, as described below) in accordance with the subject disclosure. As most clearly illustrated in FIGS. 2 and 3, according to a first exemplary embodiment, the illuminated tinsel garland 100 (garland) comprises an elongated flexible transparent plastic tube 102, a flexible electrically powered illumination string 104 disposed in the tube, and a plurality of radially directed fiber optic filaments 106 secured to an exterior of the tube.

The elongated flexible transparent tube 102 can be clear for optimum light transmission from the lamp or lamps of the illumination string 104, discussed below. Additionally, the tube 102 can be colored or colorless. Further, the tube 102 can be from about 1 m to 10 m in length, including 0.5, 1.5, 2.0, 2.5, 3.0, 3.5, 4.0, 4.5, 5.0, 5.5, 6.0, 6.5, 7.0, 7.5, 8.0, 8.5, 9.0, 9.5, 11.0, 12.0 and 13.0 m in length. It is understood that the flexible electrically powered illumination string 104, discussed below, can have a length at least as long as the tube 102 whereby the tube can be fully illuminated along its length in operation.

The illumination string 104 can be selected from an incandescent lamp light string, an LED lamp light string and a neon lamp light string. If the illumination string is an incandescent lamp light string or an LED lamp light string, the incandescent lamps or LEDs should be spaced apart less than about 3 cm in order to assure that the light emitted by the plurality of radially directed fiber optic filaments 106, discussed below, is substantially continuous along the length of the garland. If the illumination string is a neon lamp string, the single continuous neon lamp provides essentially continuous light along its length, whereby the light emitted by the plurality of radially directed fiber optic filaments is essentially continuous along the length of the garland.

The illumination string 104 can be alternating current (AC) powered and include a male electrical plug 108 at a first end of the string and a female plug socket 110 at a second end of the string opposite the first end. The male electrical plug 108 is shown inserted into a wall outlet 550 in FIG. 1. In addition, by having a male plug 108 and a female socket 110 at the opposite end, two or more lengths of garland 100 may be connected together to extend the overall length of the garland.

In the alternative, the illumination string 104 can be direct current (DC) powered by an unillustrated battery.

Further, the illumination string 104 may be equipped with a control box 112 including suitable circuitry and controls to enable a user to change the color of the light emitted by the lamps in or on the illumination string, as well as to change the pattern of light emitted by the illumination string from solid "on", to blinking, to a "wave" pattern, and so on.

The plurality of radially directed fiber optic filaments 106 can be made of glass or plastic and can be secured to the exterior of the tube 102 by adhesive bonding, solvent bonding or heat bonding, or the like. The fiber optic filaments may be substantially rigid or flexible. It is contemplated that the fiber optic filaments 106 may be secured to the exterior of the tube by various methods. For example, the exterior of the tube 102 can first be coated with an adhesive. Thereafter, bunches or bundles of fiber optic filaments 106 can be manually or mechanically placed into endwise contact with the exterior of the tube in repeated fashion about the exterior of the tube until the tube is substantially covered with radially directed filaments which become secured to exterior of the tube upon curing of the adhesive.

The fiber optic filaments 106 can be closely arranged to one another, e.g., spaced apart from about 3 mm to 5 mm about the exterior of the tube 102. Alternatively, the fiber optic filaments can be densely packed, e.g., spaced apart from 0 mm to less than about 3 mm about the exterior of the tube. The fiber optic filaments can be any suitable diameter, e.g., from about 0.25 mm to 3 mm, including 0.3, 0.4, 0.5, 1.0, 1.5, 2.0, 2.5, 3.5 and 4.0 mm. In addition, the length of the fiber optic filaments can range from about 1 cm to 6 cm, including 0.5, 1.5, 2.0, 2.5, 3.0, 3.5, 4.5, 5.0, 5.5, 6.5 and 7.0 cm. In any case, the arrangement of the plurality of radially directed fiber optic filaments 106 should be of sufficient density to substantially replicate the exterior appearance of a bottle brush, whereby the fiber optic filaments radiate light essentially 360 degrees about the circumference of the tube 102 for substantially the entire length of the tube.

Figure 4:
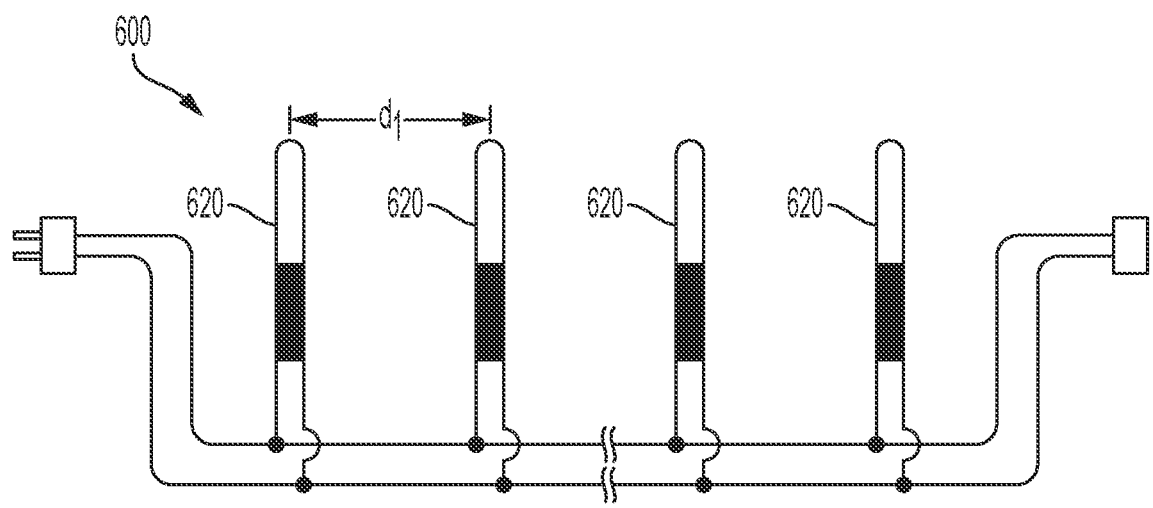
FIG. 4 is a schematic view of a conventional parallel circuit holiday light string.

Turning to FIG. 4, there is shown schematic view of a conventional parallel circuit holiday light string 600 including plurality of incandescent or LED lamps 620 spaced apart a distance $d_1$ from each other. In conventional holiday light strings distance $d_1$ is typically about 5.6 cm to about 12.7 cm. As a consequence, the light emanating from the lamps 620 is discrete and discontinuous along the length of the light string.

Figure 5:
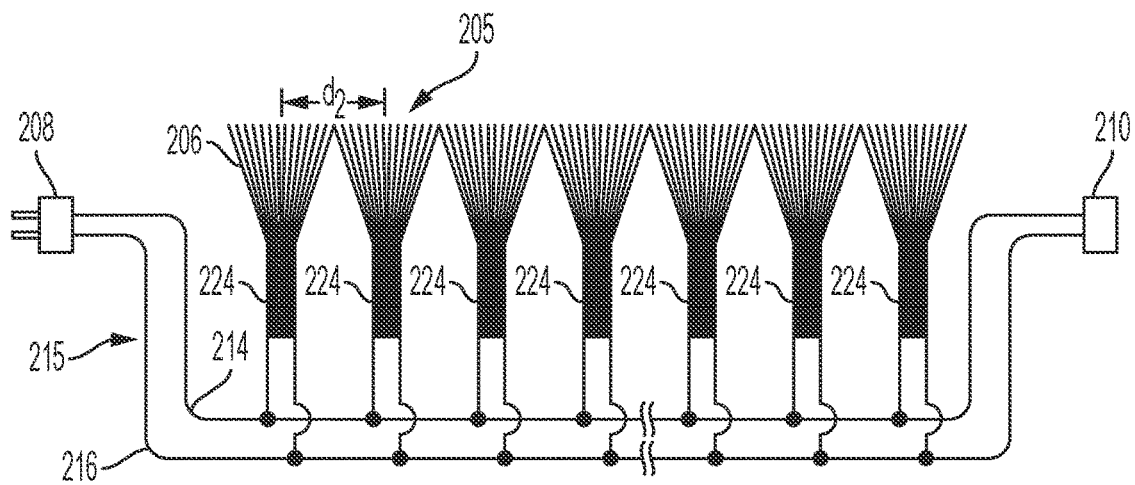
FIG. 5 is a schematic view of a second exemplary embodiment of illuminated tinsel garland constructed in accordance with the subject disclosure.
Figure 6:
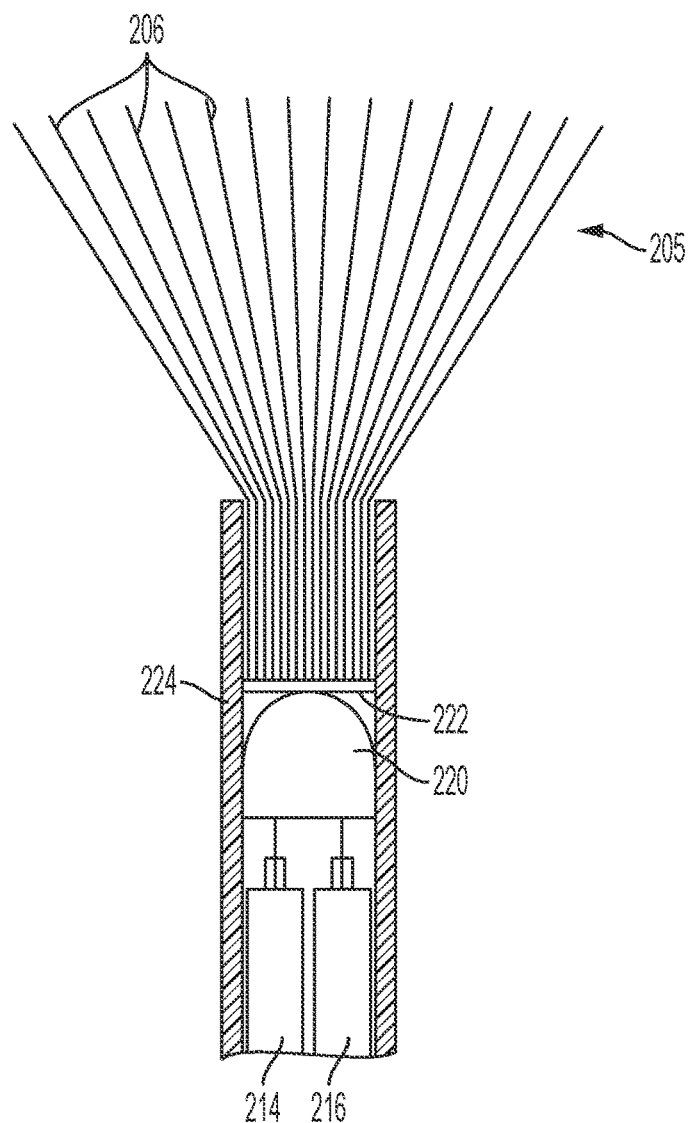
FIG. 6 is a partial cross-sectional view of a single lamp assembly of the illuminated tinsel garland of FIG. 5.

Referring to FIGS. 5 and 6, there is shown illuminated tinsel garland 200 constructed according to a second exemplary embodiment of the subject disclosure. Garland 200 comprises a flexible electrically powered illumination string 215 including positive and negative wires 214 and 216, respectively, to which a plurality of incandescent or LED lamps 220 are connected. At opposite ends of the wires 214, 216 are a male electrical plug 208 and a female socket 210.

Wires 214, 216 deliver power to the lamps when the male electrical plug 208 is inserted into an electrical outlet or into a female socket of another garland which is directly or indirectly plugged into an electrical outlet. Although shown in schematic form, it is understood that the wires 214, 216 in FIG. 5 are in actuality spiraled about one another similar to conventional parallel light strings. As a result, the "spray" of fiber optic filaments 206 outwardly projecting from each housing 224 tend to overlap 360 degrees about the circumference of the wires to provide substantially continuous light along the length of the wires.

As shown in FIG. 6, a housing 224 tightly contains the portions of wires 214, 216 which connect to a lamp 220, the lamp 220 itself, an optional clear and colorless glass or plastic disk 222, and the proximal portions of a bundle or bunch 205 of fiber optic filaments 206 associated with the lamp. According to an aspect, the housing 224 may be in the form of a shrink wrapped plastic cylinder, or the like.

According to an exemplary but non-limitative embodiment, the lamp 220 can be a 5 mm diameter LED lamp and the fiber optic filaments 206 can be about 0.4 mm in diameter. So constructed and arranged, approximately 100-120 fiber optic filaments 206 can be packed or bunched in a bundle 205 in the housing 224. The bundle 205 of fiber optic filaments 206 is in light-transmissive communication with each one of the plurality of lamps 220. In other words, the proximal ends of the fiber optic filaments 206 receive light emitted by the LED lamp 220, which light emanates from the distal ends of the fiber optic filaments. The fiber optic filaments 206 can be fabricated from glass or plastic and are preferably flexible. Accordingly, as shown in FIGS. 5 and 6, the flexible fiber optic filaments bend and diverge at the point where they exit the housing 224, whereby they project light in a considerably wider circumference than the circumference of the housing. In this regard, in order to assure continuity of light transmission along the length of the garland 200, the lamps 220 are, according to an exemplary embodiment, spaced apart a distance $d_2$ of no more than about 3 cm along the string 215. The garland 200 can be from about 1 m to 10 m in length, including 0.5, 1.5, 2.0, 2.5, 3.0, 3.5, 4.0, 4.5, 5.0, 5.5, 6.0, 6.5, 7.0, 7.5, 8.0, 8.5, 9.0, 9.5, 11.0, 12.0 and 13.0 m in length. Further, although not shown, the space between the housings 224 may be provided with conventional tinsel in order to promote reflection of the light emanated by the fiber optic filaments 206 such that the continuity of light transmission along the length of the garland 200 is further enhanced.

In addition to being wrapped around a Christmas tree, the garland 100 or 200 may be hung over doorways or mounted to adorn a drape line along walls or ceilings for bright and interesting fiber optic decoration.

It will be appreciated by those skilled in the art that changes could be made to the exemplary embodiments described above without departing from the broad inventive concept thereof. It is to be understood, therefore, that this disclosure is not limited to the particular embodiments disclosed, but it is intended to cover modifications within the spirit and scope of the subject disclosure as defined by the appended claims.

I claim:

1. Illuminated tinsel garland comprising:
    a flexible electrically powered illumination string including a plurality of lamps arranged 360 degrees about the circumference of the string and spaced apart no more than about 3 cm along the string; and
    a bundle of fiber optic filaments in light-transmissive communication with each one of the plurality of lamps.

2. The illuminated tinsel garland of claim 1, wherein proximal ends of the fiber optic filaments receive light emitted by the lamp, which light emanates from distal ends of the fiber optic filaments.

3. The illuminated tinsel garland of claim 1, further comprising a housing containing one of the plurality of lamps and proximal portions of the bundle of fiber optic filaments associated with the lamp.

4. The illuminated tinsel garland of claim 3, wherein the fiber optic filaments are flexible.

5. The illuminated tinsel garland of claim 4, wherein the fiber optic filaments bend and diverge at a point where they exit the housing, whereby the fiber optic filaments project light in a wider circumference than a circumference of the housing.

6. The illuminated tinsel garland of claim 1, wherein the plurality of lamps are incandescent or LED lamps.

7. The illuminated tinsel garland of claim 1, wherein the garland is between about 1 m to 10 m in length.

* * * * *